United States Patent [19]
Haruta et al.

[11] Patent Number: 5,624,585
[45] Date of Patent: Apr. 29, 1997

[54] METHOD AND APPARATUS FOR WELDING MATERIAL BY LASER BEAM

[75] Inventors: Koichi Haruta; Yuichiro Terashi, both of Sodegaura, Japan

[73] Assignee: Mitsui Petrochemical Industries, Ltd., Tokyo, Japan

[21] Appl. No.: 139,793

[22] Filed: Oct. 22, 1993

[30] Foreign Application Priority Data

Oct. 23, 1992 [JP] Japan .................................. 4-309718

[51] Int. Cl.$^6$ ............................. B23K 26/00; B23K 26/06
[52] U.S. Cl. ................................. 219/121.63; 219/121.74
[58] Field of Search ........................... 219/121.11, 121.6, 219/121.61, 121.63, 121.64, 121.78, 121.79, 121.8, 121.73, 121.75, 121.76, 121.77, 121.74, 121.13; 350/189

[56] References Cited

U.S. PATENT DOCUMENTS

| | | | |
|---|---|---|---|
| 3,805,015 | 4/1974 | Herziger et al. | 219/121.73 |
| 3,947,093 | 3/1976 | Goshima et al. | 219/121.63 |
| 4,825,035 | 4/1989 | Moriyasu et al. | 219/121.61 |
| 4,912,297 | 3/1990 | Beyer et al. | 219/121.63 |

FOREIGN PATENT DOCUMENTS 8808353   3/1988   WIPO.

OTHER PUBLICATIONS

Patent Abstracts of Japan vol. 014, No. 323 (M–0997) 11 Jul. 1990 & JP–A–02 108 486 (Teijin Seiki Co Ltd) 20 Apr. 1990.

Patent Abstracts of Japan vol. 014, No. 159 (M–0956) 28 Mar. 1990 & JP–A–02 020 681 (Fujitsu Ltd) 24 Jan. 1990.

Schweissen & Schneiden, vol. 44, No. 10, Oct. 1992, Dusseldorf, DE, pp. 553–559, XP000305087 G. Chen et al 'Streckenenergie . . . Dauerbetrieb'.

*Primary Examiner*—Tu Hoang
*Attorney, Agent, or Firm*—Sherman and Shalloway

[57] ABSTRACT

A laser beam having a circular cross section is irradiated obliquely with respect to a line vertical to a irradiating surface of material including a metal or by shaping the laser beam through an optical system of an irradiation unit, and then the laser beam having an elliptical shape is irradiated on the irradiating surface to thereby suppress weld defects such as weld cracks in weld joints of a difficult-to-weld material such as aluminum alloy.

12 Claims, 8 Drawing Sheets

METHOD AND APPARATUS FOR WELDING MATERIAL BY LASER BEAM

BACKGROUND OF THE INVENTION

The present invention relates to a method for welding material including metal by laser beam, and more particularly to a laser welding method for a lap joint, a butt joint, a fillet joint and the like of metal material such as aluminum alloy. In particular, the present invention relates to a laser welding method for seam-welding for these joints.

The aluminum alloy defined by JIS(Japanese Industrial Standard) H4000-H4100 is widely used in an automotive vehicle industry, a light industry and a heavy industry as structural material which has a low specific weight, an anti-corrosive property, an aesthetic appearance and a deep-drawing property but it is known as an alloy on which it is difficult to perform a welding process.

An arc or spot welding such as MIG and TIG and a laser welding using CW type or pseudo CW type laser beam such as $CO_2$ laser has been carried out for a long time as a welding method for welding such a metal material that would be difficult to weld.

In case of welding by YAG laser, a laser beam is transmitted through an optical fiber and/or a fixed optical system to a condenser lens system to form a circular cross-section beam, which is irradiated to a welding workpiece for carrying out the welding.

However, such a conventional welding method for difficult-to-weld material such as aluminum alloy suffers problems that weld defects such as welding breaks, cracks and blow holes would be likely to occur. In particular with a pulse YAG laser, it is unavoidable to prevent solidification cracks that is one of welding cracks. This makes it difficult to widely use difficult-to-weld material in an industrial field.

It is well known that even in case of the pseudo CW type YAG laser, the higher the weld temperature and the weld speed become, the more the solidification cracks are likely to occur in the difficult-to-weld material by the laser welding.

SUMMARY OF THE INVENTION

In order to overcome the above-noted defects, according to the present invention, there is provided a method for irradiating a material including metal with a laser beam for welding, comprising the step of: welding the material including metal by a laser beam whose beam shape is formed with an ellipse on an irradiated outer surface of said material.

Under a just focus condition, a ratio "$e=L_{mi}/L_{ma}$" between a minor axis($L_{mi}$) and major axis($L_{ma}$) of said ellipse on a irradiated surface of said material meets the following condition:

$$0 < e < 0.96$$

The elliptical beam shape may be formed by passing in an oblique direction with respect to a line vertical to the irradiated surface.

On the other hand, the elliptical beam shape may be formed by optical means before irradiating the surface of said material.

The laser may be a YAG laser.

According to another aspect of the invention, a laser-welding apparatus comprising: a laser resonator having an exciting lamp and a laser rod; and a laser irradiation unit having an optical system for receiving a laser beam generated in said laser resonator and for forming said laser beam into a laser beam having an ellipse in cross section and irradiating the laser beam onto a material to be welded.

The optical system may be combination lens composed of plano-convex lenses, plano-concave lenses or the like.

Furthermore, according to another aspect of the invention, a laser-welding apparatus comprising: laser resonator means having an exciting lamp and a laser rod; laser irradiation unit means having an optical system for receiving a laser beam generated in said laser resonator and for irradiating the laser beam onto a material to be welded; and support means for supporting the laser irradiation unit means in an oblique direction with respect to a line vertical to the irradiated surface of material.

The support means may be robot arm and the like.

DESCRIPTION OF THE PREFERRED EMBODIMENTS

The present invention will now be described with reference to the accompanying drawings. According to the present invention, in order to make a laser beam shape elliptical on a beam irradiated surface, as shown in, for example, FIG. 1, a laser beam 2 having a circular cross section is irradiated obliquely at an angle θ (herein after referred to the slant angle θ relative to a line nearly vertical to a surface of a workpiece 1 made of material including metal from an optical system (not shown in FIG. 1) for condensing the beams into a circular cross section. Thus, a laser beam 3 having an elliptical shape on the beam irradiated surface may be made.

Figure 2A:
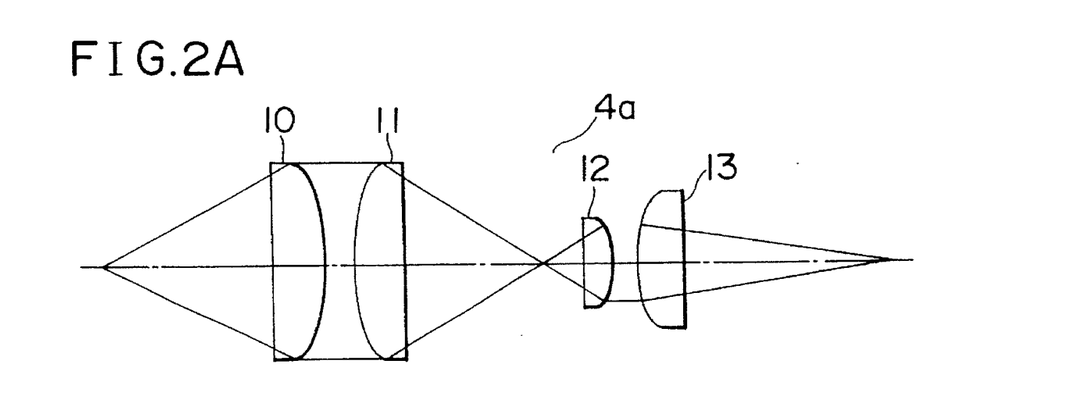
FIGS. 2A and 2B are illustrations for shaping the beam in an ellipse on the irradiating surface according to other methods of the invention.
Figure 2B:
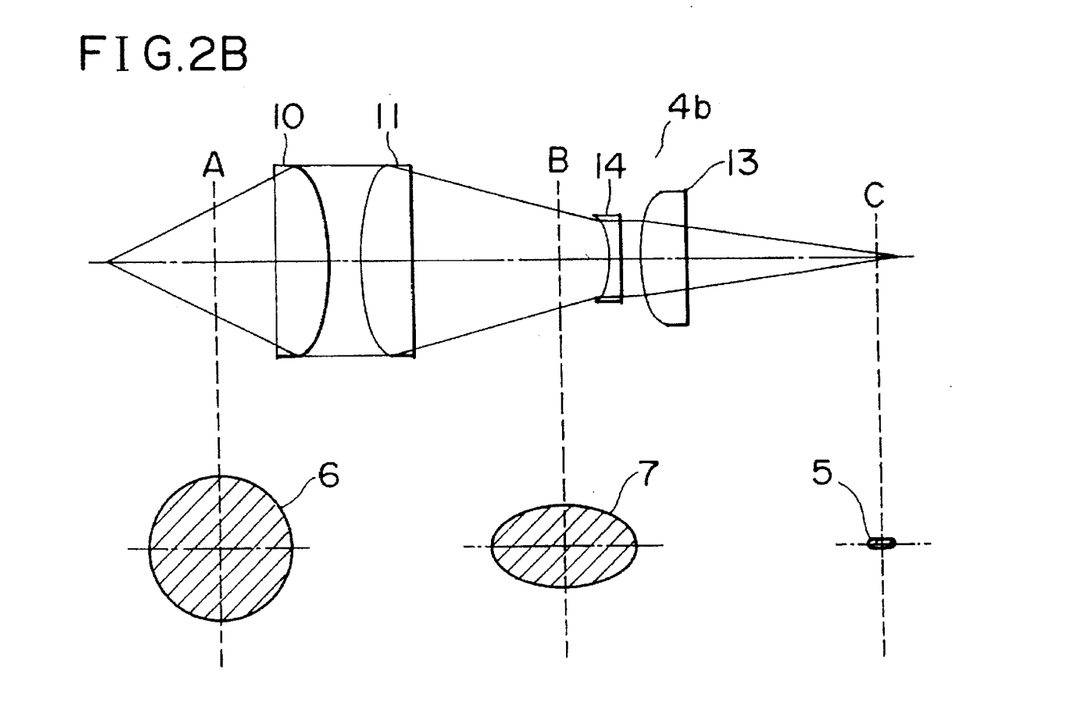

There are methods for forming, in the same manner, a beam 5 having an elliptical shape on the irradiating surface (at a position indicated by C in FIG. 2B) by irradiating an elliptical laser beam onto a surface of a workpiece by using an optical system for converging the beam directly into the elliptical shape as shown in FIGS. 2A or 2B in which reference numeral 6 denotes the beam shape at the position A, numeral 7 denotes a beam shape at the position B, numerals 10 and 13 denote plano-convex lenses, numeral 11 denotes a plano-convex cylindrical lens, and numeral 14 denotes a plano-concave cylindrical lens.

In an elliptical beam formed by any method, an ellipticity of the ellipse is preferably within a range, $0<e<0.96$ to prevent the weld defects such as cracks in the welding joints.

Figure 1:
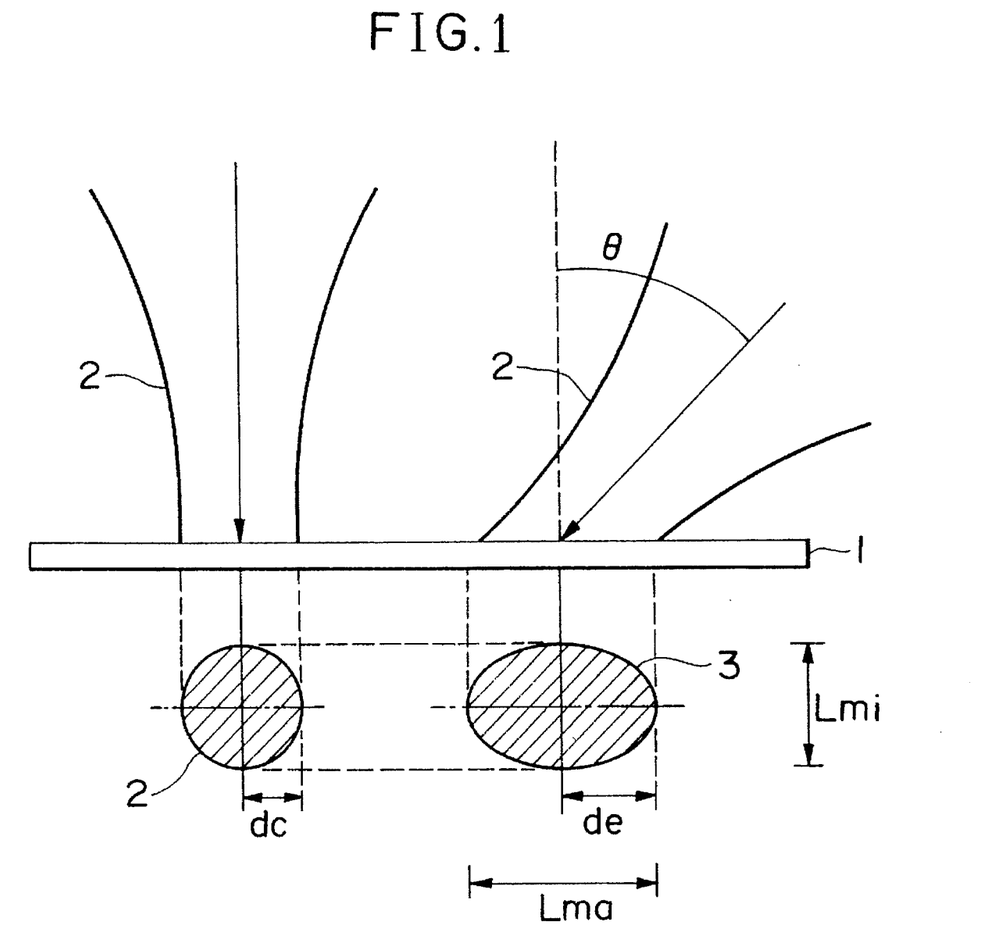
FIG. 1 is an illustration for an example of a method for shaping a beam on a irradiating outer surface by using a circular beam according to the present invention.

Incidentally, in the case where the elliptical beam is obtained in accordance with the method shown in FIG. 1, the slant angle θ is preferably set in the range, $16°<θ<90°$, further preferably $16°<θ≦45°$. The upper limit of the range is decided by the angle of the laser irradiation unit supported by support means such as robot arm and the angle of the total reflection of irradiated surface of the material. It is necessary to set the angle of the upper limit to avoid contact between the optics system and the irradiated object when θ approaches 90°. However, when an ellipse beam is formed with the optical system, the e can be brought close to 0° (corresponds to θ=90°).

The relationship between the ellipticity of the ellipse and the slant angle θ is given as follows:

ellipticity $e = dc/de = \cos θ$ where dc is the radius of the beam which has not yet been slanted, and de is the long axial radius of the ellipse. The area Se of the cross section of the beam which has been slanted is given as follows:

$$Se = 4\pi de \cdot dc$$
$$= 4\pi dc^2/\cos θ$$

The area Se is 1/cosθ times as wide as that of the beam which has not yet been slanted.

Moreover, if the angle of the φ (Angle defined between a beam scanning direction and a major axial radius of the ellipse) becomes 45° or more, the effect of this invention is not achieved so that an minor axis of a ellipse may approach direction where the laser beam is scanned. Therefore, $0°≦φ<45°$, especially the range of $0°≦φ≦20°$ is desirable within the range of the angle of the φ.

The material used in the present invention is not limited if it includes metal. However, the present invention may well be applied to materials which are liable to suffer from high temperature cracks, blow holes and porosity, such as aluminum alloy (for example, aluminum alloy defined by JIS H4000–H4180), copper alloy, titanium alloy, stainless steel, laminate material of metal and resin, and the like.

Also, according to the present invention, it is preferable to use solid laser such as YAG laser (which may be of either pulse type or continuous type), gas laser such as $CO_2$ laser, semiconductor laser, vapor laser and the like.

The present invention will now be described in more detail by way of the following embodiments.

Figure 11:
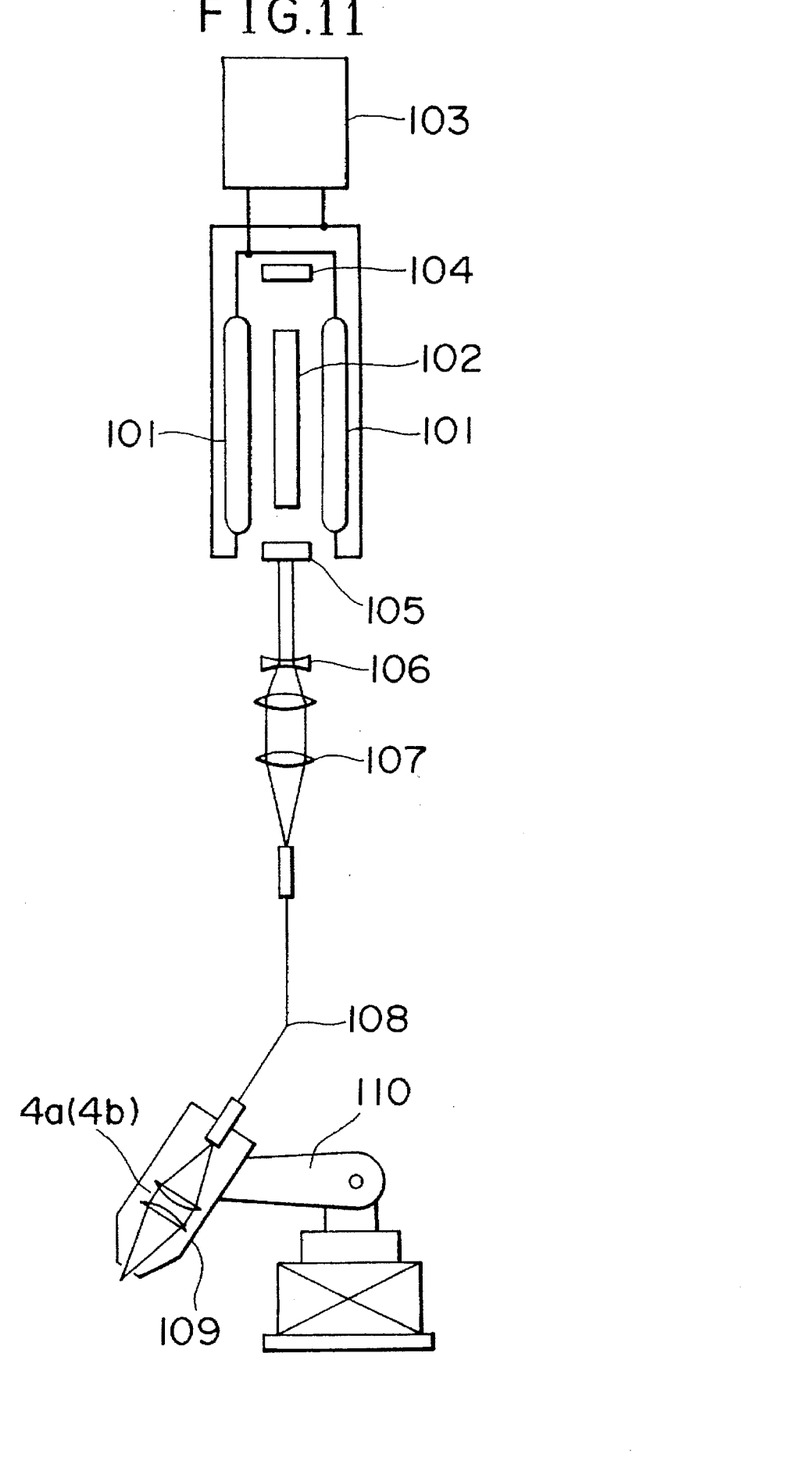
FIG. 11 is a schematic view showing a laser beam welding apparatus for carrying out the method according to the present invention.

A laser welding apparatus according to the embodiment has a structure shown in FIG. 11 in which a numeral 101 denotes exciting lamps as an exciting source, and an Nd:YAG laser rod 102 is interposed between the exciting lamps. A power source 103 is connected to the exciting lamps 101 for supplying a predetermined electric power to the lamp 101.

A total reflection mirror 104 and an output mirror 105 are disposed in an axial direction of the laser rod 102. A divergent optical system 106 for receiving the output laser is disposed outside of the output mirror 105. The laser beam that has passed through the divergent optical system 6 is introduced into an optical fiber 108 through a coupling lens 107 for the fiber.

An irradiation unit 109 having an optical system 4a (or 4b) is mounted at a free end of the optical fiber 108 so that the welding (i.e., cutting) is performed by the laser beam irradiated from the irradiation unit 109.

The irradiation unit 109 is being supported by the arm 110 of the robot as shown in the FIG. 11 and the unit is moved and the unit is arranged in an oblique direction with respect to a line vertical to the irradiated surface of material.

As a result, the irradiation unit can irradiate the laser beam to the oblique or the vertical direction for the irradiated surface.

The welding was carried out under the condition of an Ar shield gas atmosphere with a gas flow rate was 20 liter/min. Optical system was irradiated onto the surface of a single (bead-on-plate) Al—Mg alloy (which was 100 mm long, 30 mm wide and 1.0 mm thick) defined by A5052-P-0 of JIS H4000.

EXAMPLES 1 AND 2

Optical system was irradiated at the slant angle θ=20° (first example; the ellipticity of the ellipse obtained at this time e=0.94) and at the slant angle θ=30° (second example; the ellipticity of the ellipse obtained at this time e=0.87)

The welding was carried out under the condition that the welding speed was 1.0 mm/sec. over 10 min. Incidentally, an angle φ between a scanning direction of the beam and the major axis of the ellipse was 0°, i.e., the scanning direction of beam was parallel to the axial direction of the major axis of the ellipse.

Figure 12A:
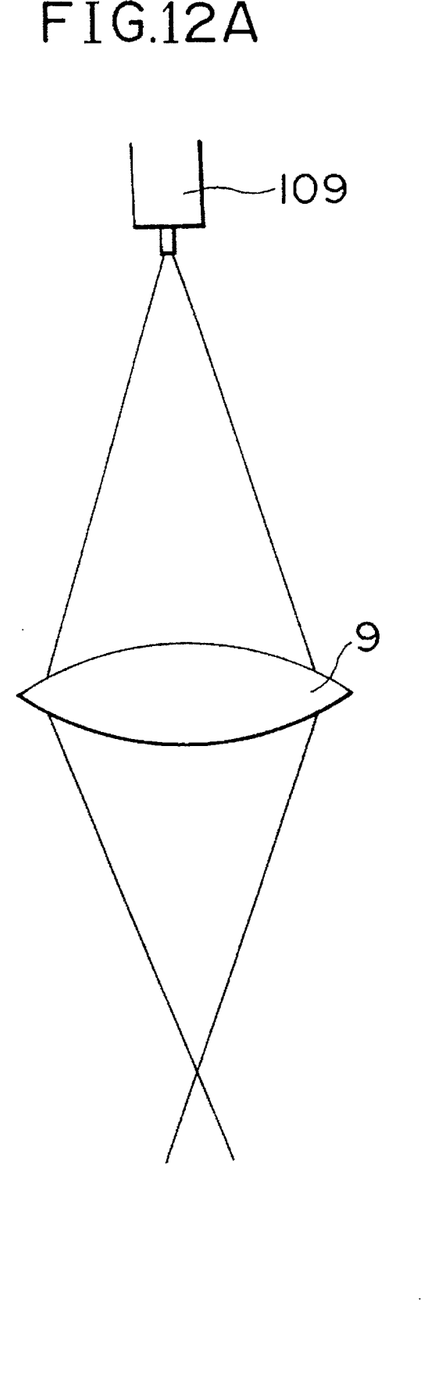
FIGS. 12A and 12B are examples of optical system of this invention.
Figure 12B:
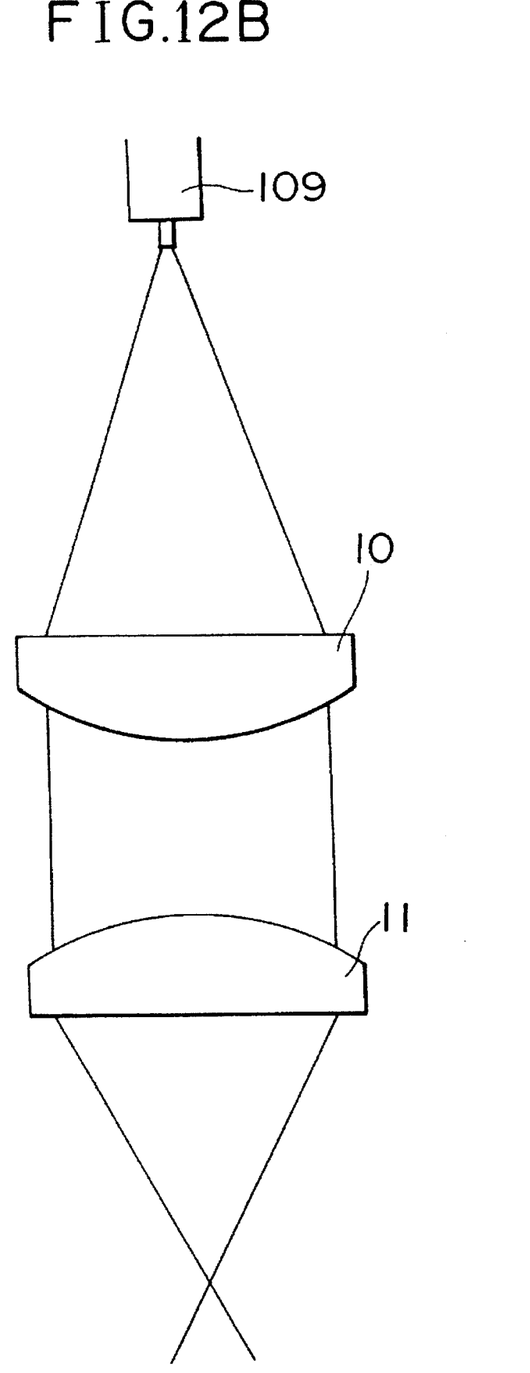

Laser: pulse YAG laser (wavelength of 1.06 μm)
  multi-mode
  repeated frequency 14PPS
  laser output waveform two-stage waveform
  peak output (first stage) 1.52 kW
  (second stage) 0.58 kW
  pulse width (first stage) 10 msec.
  (second stage) 10 msec.
  average output 294 W
Optical System: focal length f 120 mm
  focal point just focus
  beam shape circular (diameter 1.1 mm)
  The combination lens which arranges two plano-convex lenses as shown in FIG. 12B or the single lens whose both sides were composed by convex lens in FIG. 12A can be enumerated as an example of optical system by which such sections generate a round beam.

In order to evaluate the thus formed weldings, the status of the cracks in the welded surfaces and the cracks or blow holes of the interior of the weldings were microscopically observed.

Furthermore, a constant displacement bending test in which a workpiece was subjected to a constant displacement bend was conducted. In the same manner, the status of the crack generation was inspected microscopically. Incidentally, in the constant displacement bending test, cracks were generated in parallel with a weld joint direction in the weld part. In this case, if the solidification cracks were generated in the weld part, the respective solidification cracks were developed into linear cracks due to the bending stress, and this status was observed as the long cracks in parallel with the weld direction. On the other hand, if the solidification cracks were not present in the welding part, since the cracks were generated in various parts, the short cracks were dispersedly generated in the various parts.

Figure 3:
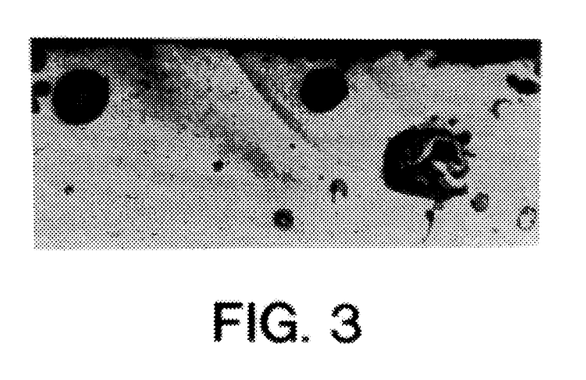
FIG. 3 is a microscopic photographic view showing a weld formation in parallel cross section of a welded workpiece obtained by a condition of a beam slant angle $\theta=20°$ in a first example.
Figure 4:
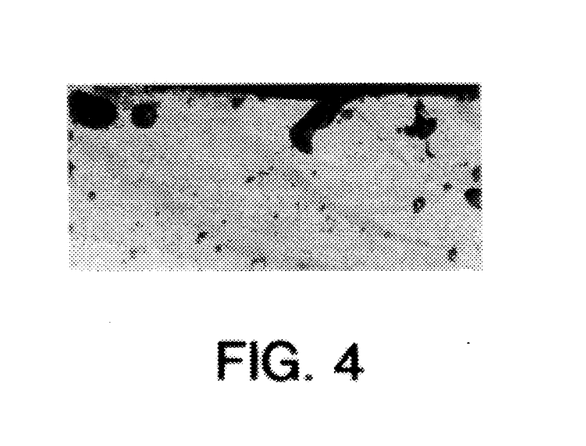
FIG. 4 is a microscopic photographic view showing a weld formation in parallel cross section of a welded workpiece obtained by a condition of a beam slant angle $\theta=30°$ in a second example.
Figure 5:
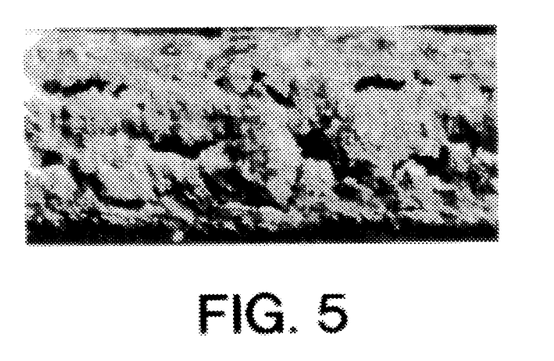
FIG. 5 is a microscopic photographic view showing a weld formation in parallel cross section of a welded workpiece obtained by a condition of a beam slant angle $\theta=20°$ in a first example after a constant displacement bending test.
Figure 6:
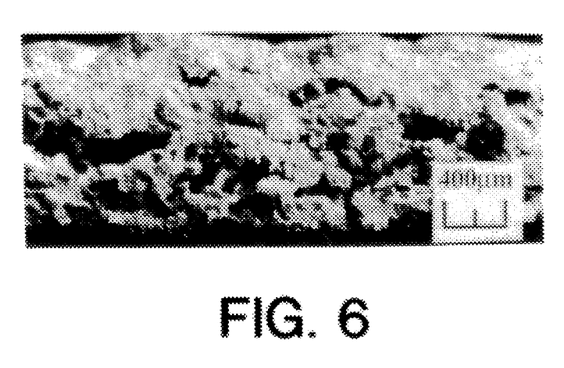
FIG. 6 is a microscopic photographic view showing a weld formation in parallel cross section of a welded workpiece obtained by a condition of a beam slant angle $\theta=30°$ in a second example after a constant displacement bending test.

The results of the observation (except for the surface observation before the constant displacement bending test) are shown in FIGS. 3 to 6. FIG. 3 is a microscopic photographic view showing a welding formation on a parallel cross section of the weld workpiece obtained by the welding condition of the beam slant angle $\theta=20°$ in the first example Example 1. FIG. 4 is a microscopic photographic view showing a welding formation on a parallel cross section of the weld workpiece obtained by the welding condition of the beam slant angle $\theta=30°$ in Example 2. FIG. 5 is a microscopic photographic view showing a welding formation on a parallel cross section of the weld workpiece obtained by the welding condition of the beam slant angle $\theta=20°$ in Example 1 after the constant displacement bending test. FIG. 6 is a microscopic photographic view showing a welding formation on a parallel cross section of the weld workpiece obtained by the welding condition of the beam slant angle $\theta=30°$ in Example 2 after the constant displacement bending test.

The following fact was seen from these results. Namely, there was no long crack in any of the samples through the surface observation of the weld part. It was found through the surface observation that the solidification cracks were suppressed. Also, from the results of the constant displacement bending test, it was found that, the larger the slant angle $\theta$, the more would the cracks be dispersed, and hence, the generation of solidification cracks would be suppressed.

EXAMPLES 3

The optical system 4a is composed, in combination, of the plano-convex lenses 10, 12 and 13 and the convex cylindrical lens 11 as shown in FIG. 2A. The laser beam is controlled so that the beam shape is elliptical at the time when the laser beam has passed through the plano-convex lens 10 and the plano-convex cylindrical lens 11. In order to obtain such an elliptical shape beam, for example, ratios of the nearly vertical and parallel dimensions of the respective lenses with respect to the optical axis are different from each other.

It is possible to use the optical system 4b shown in FIG. 2B instead of that 4a shown in FIG. 2A.

In FIG. 2B, the plano-concave cylindrical lens 14 is used. Namely, the laser beam which has been introduced into the irradiation unit 109 with the beam shape being a true circle (at position A) passes through the plano-convex lens 10 and the plano-convex cylindrical lens 11 to be changed in the elliptical beam (at position B). The beam further passes through the plano-concave cylindrical lens 14 and the plane-convex lens 13 with its beam shape being throttled (at position C) and is irradiated onto the workpiece.

Laser beam (e=0.90) was irradiated to the irradiating surface to be welded almost vertically.

The welding speed at this time is 1.0 mm/sec. the weld length was 10 mm. Moreover, the angle between a beam scanning direction and a major axis of the ellipse was almost 0°. That is, the direction where the laser beam was scanned was almost made parallel for a major axis of the ellipse.

The same result as this example of executing these was obtained when having examined by the same method as example 1 or 2 of executing the welding thing thus obtained.

COMPARISON EXAMPLES 1 AND 2

The experiments were conducted in the same way as in the foregoing examples except that a circular laser beam was irradiated to a workpiece at a slant angle $\theta$ of 0° (i.e., the ellipticity e=1, the circular laser beam was not changed) in Comparison Example 2 and of 10° (the ellipticity e=0.98) in Comparison Example 1. In the same way, the results were observed.

Figure 7:
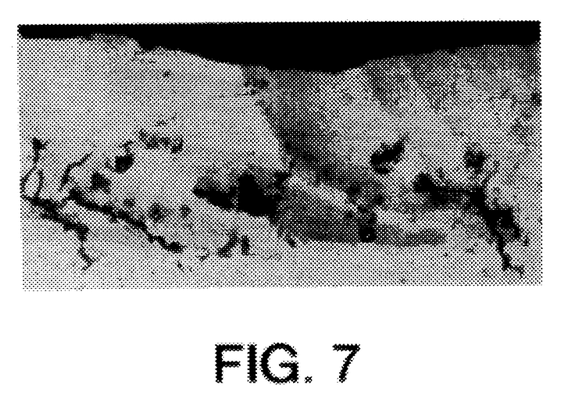
FIG. 7 is a microscopic pixotographic view showing a weld formation in parallel cross section of a welded workpiece obtained by a condition of a beam slant angle $\theta=0°$ in a first comparison.
Figure 8:
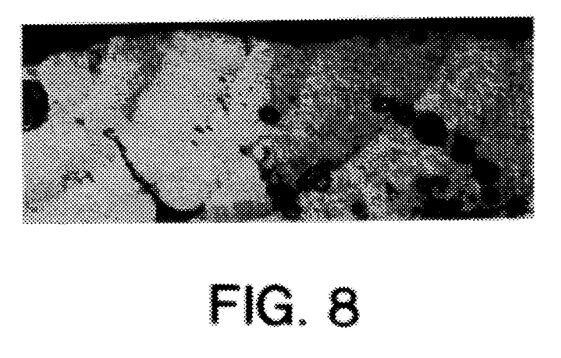
FIG. 8 is a microscopic photographic view showing a weld formation in parallel cross section of a welded workpiece obtained by a condition of a beam slant angle $\theta=10°$ in a second comparison.
Figure 9:
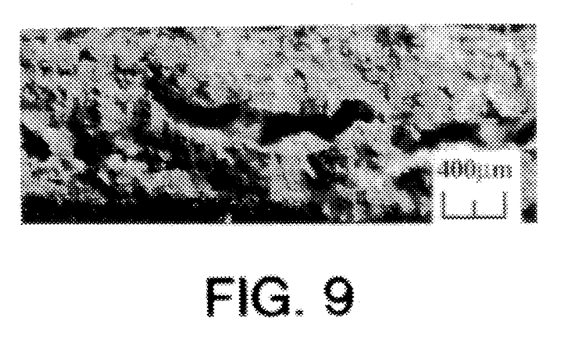
FIG. 9 is a microscopic photographic view showing a weld formation in parallel cross section of a welded workpiece obtained by a condition of a beam slant angle $\theta=0°$ in a first comparison after a constant displacement bending test.
Figure 10:
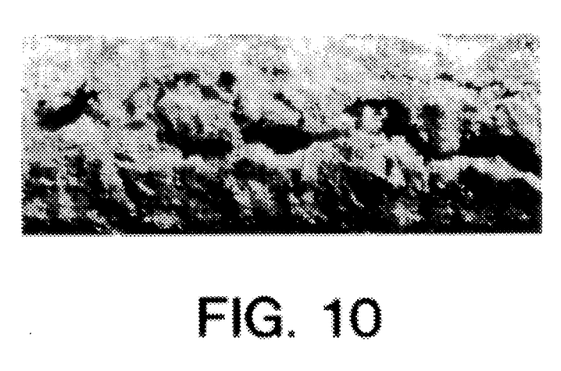
FIG. 10 is a microscopic photographic view showing a weld formation in parallel cross section of a welded workpiece obtained by a condition of a beam slant angle $\theta=10°$ in a second comparison after a constant displacement bending test.

The results (except for the surface observation before the constant displacement bending test) are shown in FIGS. 7 to 10. Incidentally, FIG. 7 is a microscopic photographic view showing a welding formation on a parallel cross section of the weld workpiece obtained by the welding condition of the beam slant angle $\theta=0°$ in comparison 1. FIG. 8 is a microscopic photographic view showing a welding formation on a parallel cross section of the weld workpiece obtained by the welding condition of the beam slant angle $\theta=10°$ in Comparison Example 2. FIG. 9 is a microscopic photographic view showing a welding formation on a parallel cross section of the weld workpiece obtained by the welding condition of the beam slant angle $\theta=0°$ after the constant displacement bending test in Comparison Example 1. FIG. 10 is a microscopic photographic view showing a welding formation on a parallel cross section of the weld workpiece obtained by the welding condition of the beam slant angle $\theta=10°$ after the constant displacement bending test in Comparison Example 2.

From these results of the surface observation of the samples, it was found that long cracks were generated in the weld surface. From the surface observation, it was found that the solidification cracks were generated. This was confirmed by the surface observation of the constant displacement bending test. Namely, according to the surface observation through the constant bending test, there was large crack development. It was found that the solidification cracks were developed from the weld workpiece surface to the deep interior.

As has been described above, according to the present invention, by irradiating a workpiece with the laser beam for welding under a specific condition that the beam shape is in the form of an ellipse having a predetermined ellipticity on the irradiated surface of the workpiece made of material including metal such as aluminum alloy or the like, it is possible to considerably suppress the weld defects such as welding cracks, in particular, solidification cracks caused by the application of the conventional laser beam.

What is claimed is:

1. A method for irradiating a laser beam on a material for welding the material, comprising the steps of:

generating a laser beam having a beam shape in the form of an ellipse; and irradiating said laser beam onto an outer surface of said material at substantially a right angle to the irradiated surface of said material so as to have a beam shape in the form of an ellipse on the irradiated outer surface of said material, wherein the shape of the ellipse on the irradiated surface is equivalent to that obtained by a laser beam, having a circular cross-section, irradiated onto said irradiated surface at an oblique angle θ of 16°<θ<90° with respect to a line vertical to the irradiated surface of said material, and wherein under a just focus condition, a ratio $e=L_{mi}/L_{ma}$ between a minor axis ($L_{mi}$) and major axis ($L_{ma}$) of said ellipse on the surface of said material meets the following condition:

$0<e<0.96.$

2. The method according to claim 1 wherein the shape of the ellipse on the irradiated surface is equivalent to that obtained by a laser beam, having a circular cross-section, irradiated onto said irradiated surface at an oblique angle θ of 16°<θ≦45° with respect to a line vertical to the irradiated surface of said material.

3. A method for irradiating a laser beam on a material for welding the material, comprising the steps of:
  generating a laser beam having a beam shape in the form of a substantially circular cross section; and
  irradiating said laser beam onto an outer surface of said material at an oblique angle θ of 16°θ<0<90° with respect to a line vertical to the irradiated surface of said material so as to have a beam shape in the form of an ellipse on the irradiated surface of said material, wherein under a just focus condition, a ratio $e=L_{mi}/L_{ma}$ between a minor axis ($L_{mi}$) and major axis ($L_{ma}$) of said ellipse on the surface of said material meets the following condition:

$0<e<0.96.$

4. The method according to claim 3 wherein said laser beam is irradiated onto an outer surface of said material at an oblique angle θ of 16°<θ≦45° with respect to a line verticle to the irradiated surface.

5. A method for irradiating a laser beam on a metal for welding the metal, comprising the steps of:
  generating a laser beam having a beam shape in the form of a circular cross section; and
  irradiating said laser beam onto an outer surface of said metal at an oblique angle θ of 16°<θ<90° with respect to a line vertical to the irradiate surface of said metal so as to have a beam shape in the form of an ellipse on the irradiated surface of said material, wherein under a just focus condition, a ratio $e=L_{mi}/L_{ma}$ between a minor axis ($L_{mi}$) and major axis ($L_{ma}$) of said ellipse on the surface of said material meets the following condition:

$0<e<0.96.$

6. The method according to claim 5 wherein said laser beam is irradiated onto an outer surface of said metal at an oblique angle θ of 16°<θ≦45° with respect to a line vertical to the irradiated surface of said metal.

7. A method for irradiating a laser beam on a metal for welding the metal, comprising the step of:
  irradiating said laser beam onto an outer surface of said metal, and
  welding the metal by a laser having a beam shape in the form of an ellipse on the irradiated surface of said metal, wherein the shape of the ellipse on the irradiated surface is equivalent to that obtained by a laser beam, having a circular cross-section, irradiated onto said irradiated surface at an oblique angle θ of 16°<θ<90° with respect to a line vertical to the irradiated surface of said material, and
  wherein under a just focus condition, a ratio $e=L_{mi}/L_{ma}$ between a minor axis ($L_{mi}$) and major axis ($L_{ma}$) of said ellipse on said irradiated surface of said material meets the following condition:

$0<e<0.96.$

8. The method according to claim 7, wherein the laser beam elliptical beam shape is formed by irradiating a laser beam, having a circular cross section, at an oblique angle θ of 16°<θ<45° with respect to a line vertical to the irradiated surface.

9. The method according to claim 8, wherein the metal comprises aluminum alloy.

10. The method according to claim 7, wherein the elliptical beam shape is formed by optical means before irradiating the surface of said metal.

11. The method of according to claim 10, wherein the metal comprises aluminum alloy.

12. The method according to claim 7, wherein the metal is a member selected from the group consisting of aluminum alloy, copper alloy, titanium alloy and steel.

* * * * *